May 1, 1928.
A. F. DILLON
1,668,107
CUT WELD TORCH
Filed April 28, 1922
3 Sheets-Sheet 1
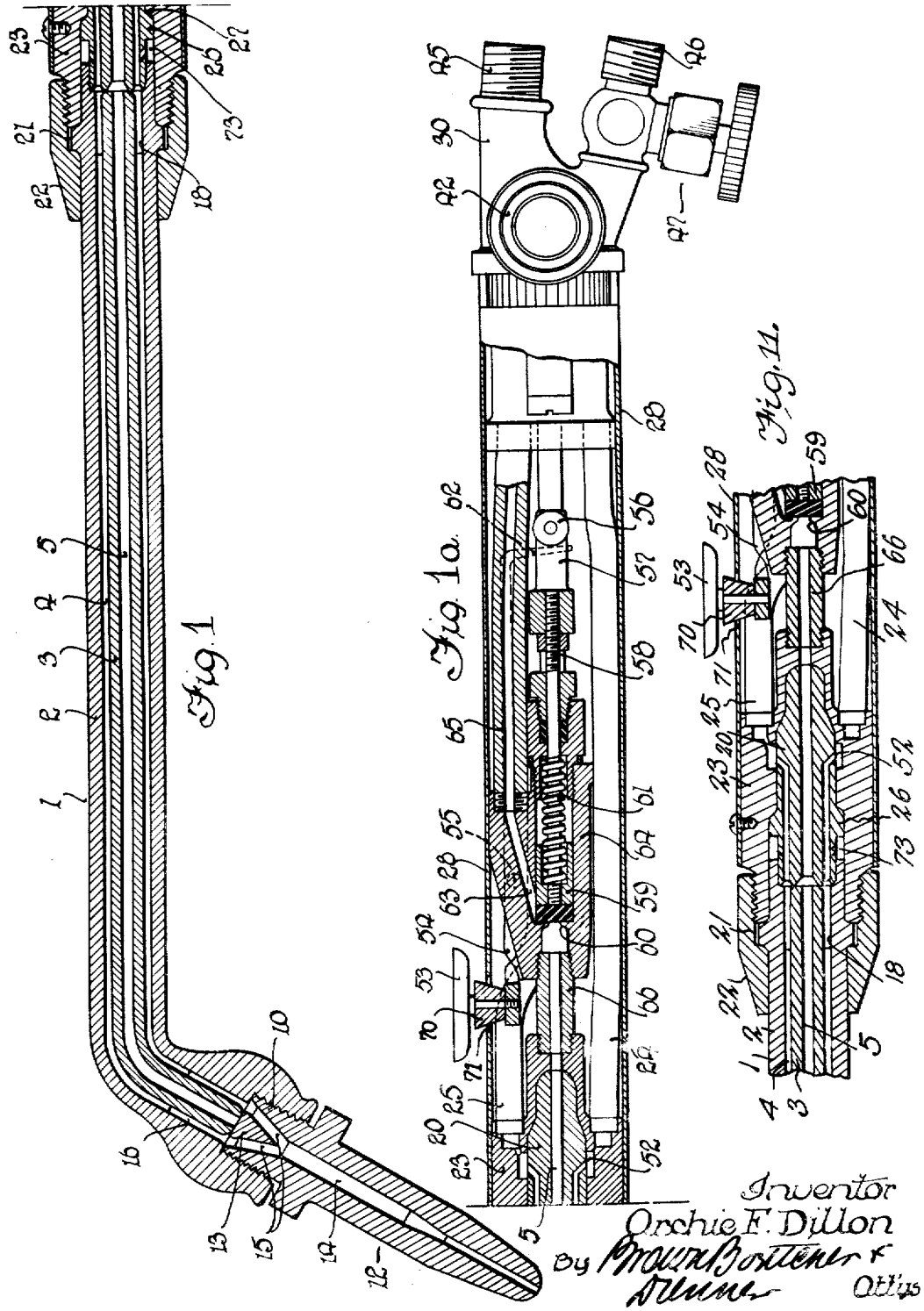

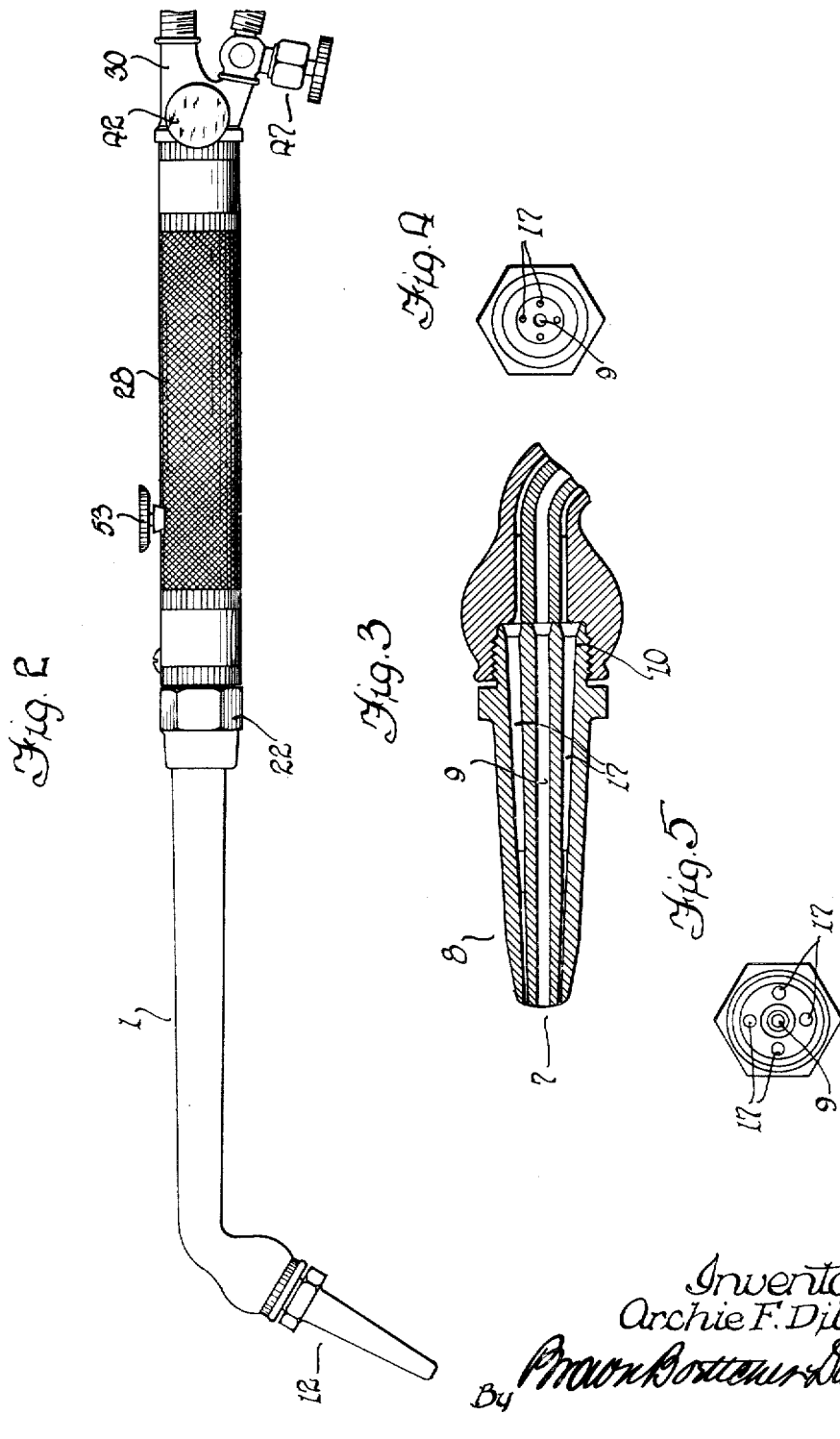

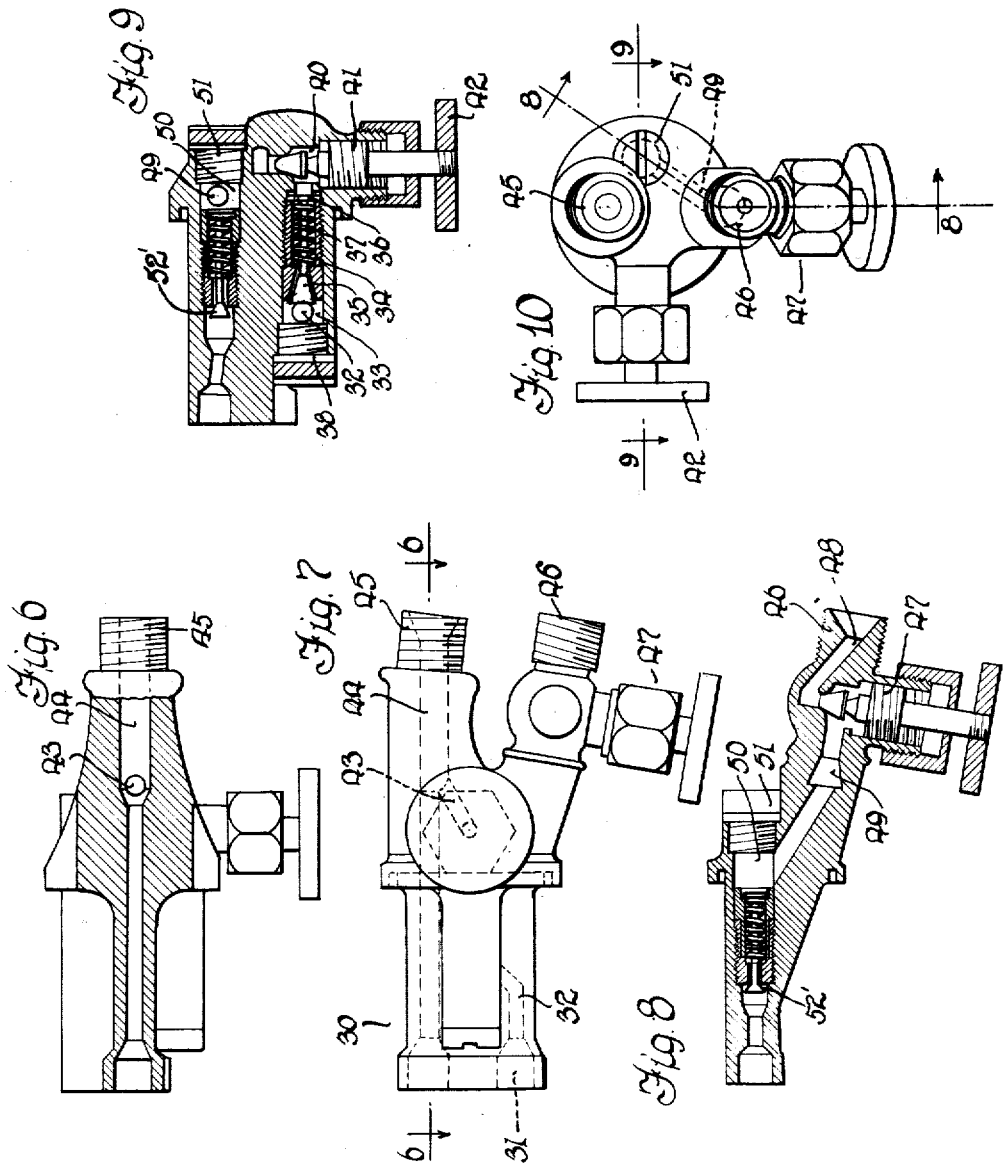

Patented May 1, 1928.

1,668,107

UNITED STATES PATENT OFFICE.

ARCHIE F. DILLON, OF CHICAGO, ILLINOIS.

CUT-WELD TORCH.

Application filed April 28, 1922. Serial No. 557,149.

My invention relates to welding apparatus and more particularly to a welding torch of that type capable of cutting as well as welding metal and generally known in the art as a cut weld torch While I shall describe my invention as applicable to cutting torches, or, in fact, to welding torches only, I do not intend to be limited to such use only, as it is apparent that these devices have a wide range of utility and many of the features may be embodied advantageously in other arts and for other purposes.

The general development of cut weld torches had been along the lines of providing a simple but efficient device capable of being used either as a welding torch or as a cutting torch. The essential characteristics of a device of this type are: First, a proper arrangement of the cutting jet and the heating flame; second, mechanism which will control the flow of the heating gas and of the cutting oxygen so that each can be properly proportioned for the thickness of the cut; and third, a construction having fluid passages of the proper shape and size for giving the proper direction of flow and admitting of proper regulation to obtain economical operation with a maximum efficiency.

It is an object of my invention to provide a simple and inexpensive construction embodying these characteristics. To this end the device has been designed so as to lead the cutting oxygen therethrough in the most advantageous manner, permitting of proper application of the oxygen jet to the cut and obtaining accurate control of the flow to the nozzle.

A further object resides in the interchangeability of the welding and the cutting nozzles without altering the structure or resulting in a complicated or a cumbersome structure. The barrel of the device is preferably provided with concentric conduits and bent at the nozzle end so as to direct the heating flame and oxygen jet at the proper angle against the material being cut. This eliminates any appreciable sharp turn in the flow of gases, which oftentimes materially alters the pressures or permits the passages to be clogged by foreign matter.

A further object of the invention is the provision of a compactly constructed valve head for carrying the valves which prevent the back flow of the combustible mixture. A supply of oxygen is fed into the mixture through this valve head. The acetylene gas unites with this supply of oxygen, but in order to prohibit the flow of one into the supply line of the other, due to unequal pressures, these valves have been embodied in the head. They serve also to safeguard against the flame surging backwards into the device and continuing on into the gas tanks.

In order to apprise those skilled in the art how to construct and practice my invention, I shall now describe an embodiment thereof in connection with the accompanying drawings in which:

Figures 1 and 1^A illustrate a longitudinal cross section of a torch embodying my invention;

Fig. 2 is a side elevation of the device drawn at a reduced scale;

Fig. 3 is a fragmentary sectional view of the device illustrating a cutting nozzle attached;

Fig. 4 is an end view illustrating the mouth of the nozzle;

Fig. 5 is a view of the opposite end of this nozzle;

Fig. 6 is a section taken through the valve head on line 6—6 of Figure 7;

Fig. 7 is an elevation of the valve head;

Fig. 8 is a section taken on line 8—8 of Fig. 10;

Fig. 9 is a section taken on line 9—9 of Fig. 10;

Fig. 10 is an end view of the valve head; and

Fig. 11 is a longitudinal cross section of the central portion of the torch.

With reference now to the drawings, the particular device in which I have illustrated the features of my invention is of the general type used for welding and cutting by the oxy-acetylene process. This process requires that the control of the oxygen jet be independent of the control of the acetylene gas. However, a certain amount of the oxygen from the oxygen supply must be mixed with the acetylene gas before reaching the nozzle so that the oxy-acetylene mixture thus formed will provide a suitable heating flame for the material to be cut or welded.

The barrel or stock 1 comprises conduits 2 and 3 disposed one within the other and so spaced that an annular passage 4 is formed between the same. The conduit 3 is formed with a passage 5 through which oxygen is fed for cutting purposes, the oxygen jet which is emitted from the mouth 7 of the nozzle 8, being central of the heating flame fed by the acetylene gas flowing thru passage 4. The nozzle 8 illustrated in Fig. 3 is employed for cutting as it is provided with a central passage 9 for registering with the passage 5. The barrel 1 is enlarged at its outer end and is internally threaded to receive the threaded end 10 of the nozzle 8. As shown in Fig. 1, the welding nozzle 12 is constructed substantially the same as regards its mounting, but has within the interior, adjacent to the inner end, a block 13 for closing off the oxygen passage 5. The mouth of the welding nozzle 12 comprises a single opening from which the combustible mixture flows, this opening preferably being the outer end of the passage 14 which at the inner end divides into a plurality of similar passages 15, to register with the annular passage 4. In mounting the conduit 3 within the conduit 2, the conduit 3 is secured at its ends by a suitable brazing operation, the fastening elements consisting preferably of a plurality of equidistantly spaced strips, such as are indicated at 16, brazed in the end of the passage 4.

The cutting nozzle 8 is preferably of a one-piece construction, being provided with the central opening 9 and a plurality of openings 17 formed by drilling from either end. The openings 17 are made to register with those formed by the spaced strips 16, for securing a continuous passage of the combustible mixture.

A very decided advantage is to be noted in the construction thus far described. The oxygen and combustible mixture must be fed under pressure without obstruction, that is, there should be nothing that tends to hamper an uninterrupted and free passage. Constructing the barrel 1 so that the gases may move substantially in a straight line uniquely obtains this uninterrupted and free passage after the gases have passed the mechanism for regulating the flow, which will be presently described.

The conduit 3 is supported at its inner end substantially in the same manner as its outer end, namely, by the brazed strips 18 equidistantly spaced so as to establish communication between the passage 4 and channels 19 in the tubular member 20. The barrel 1 terminates where the member 20 is joined, and a fluid tight fit is provided to prevent the leakage of oxygen or acetylene gas. An annular shoulder 21 on the outer periphery of the barrel 1 is engaged by the coupling 22. The coupling is threaded onto the connection 23 to which an oxygen pipe 24 and an acetylene pipe 25 are attached. The member 20 is formed with an integral annular shoulder 26 which tapers backwardly from the outer perimeter for engaging a similarly formed surface 27 on the interior of the connection 23. The tapered engagement allows the member 20 to be drawn up tightly against the conduits 2 and 3 when the coupling 22 is threaded upon the connection 23.

The oxygen pipe 24 extends backwardly thru the shell or handle 28 and connects with the valve head 30 at the port 31. This port 31 is connected by means of the orifice 32 with the cored out passage 33, as shown in Fig. 9. The passage 33 has a portion of its wall threaded to receive the valve body 34 carrying the valve 35 which prevents backward flow of the acetylene should the pressure of the latter be greater than that of the oxygen. The valve 35 is of a well known construction, being in the path of the flow, and closing off the backward flow against the action of the spring 37. A threaded plug 38 is employed to close off one end of the passage 33, while the other end communicates with the opening 40 having the reducing valve 41. The reducing valve is of the threaded type and is controlled by the button 42. Thus the flow may be reduced or increased according to the amount needed for mixing with the acetylene in order to form a combustible mixture capable of producing a hot flame at the nozzle. As shown in Fig. 7, this supply of oxygen is obtained by way of the orifice 43, from the channel 44 having connection with the source of supply by any suitable coupling with the nipple 45.

The acetylene pipe 25 also extends backwardly through the shell 28, and connects with the valve head 30. Acetylene gas is fed through the nipple 46 as shown in Figure 8, and is controlled by a reducing valve 47 which is of the same type as the valve 41. The valve 47 connects the opening 48 with the passage 49. The passage 49 communicates with the opening 50 closed off at one end by a plug 51. A back pressure controlling valve 52' is provided in the opening 50 for closing it off when there is a backward flow of the oxygen or of the combustible mixture. This prevents the flame from reaching the supply tanks (not shown). The opening 50 receives the end of the acetylene pipe 25, so that there is a free passage to the mixing chamber 52 in the member 22 where the acetylene and oxygen meet and mix to form a combustible mixture, and then pass through the passage 4 to the nozzle and are burned.

The oxygen employed for cutting is controlled by the button 53 which is carried at one end of the cam arm 54 pivotally mounted at 55. The opposite end of this arm 54 is bent over to form a finger 62 for engaging a projection 56 carried on the head 57, which is mounted at the outer end of the piston valve rod 58. A piston valve 59 is held upon the valve seat 60 by the spring 61.

The passage 63 in the valve block 64 and communicating with the channel 44 by way of the pipe 65, is thereby closed off from communication with the passage 5, which extends back into the member 20, connection 23 and coupling 66. When the button 53 is pressed inwardly, the finger 62 cams the projection 56 toward the valve head 30. This moves the piston valve 59 off its seat and allows the oxygen to flow through the barrel to the nozzle 8 where it is discharged by way of the opening 9.

It is to be noted that the oxygen jet flows from the nozzle in concentric relation to the heating flame. By referring to Fig. 3, the reason for this will be apparent. The cutting nozzle has the orifices 17 through which flow the combustion mixture, and these orifices 17 surround the orifice 9. The cutting tool may be moved in any direction, over the material being cut without destroying this concentric relation which keeps the heating flame in front of the oxygen jet at all times. The manner of attaching the nozzles to the front end of the barrel 1 results in an advantageous construction, allowing the gases to flow substantially in a straight line and the nozzles to be interchangeably attached, and permitting the oxygen passage to be closed off without hampering the flow of the combustible mixture when the welding nozzle 12 is employed.

Control of the oxygen by means of the button 53 permits the tool to be easily handled during the cutting operation. The flow of the acetylene and oxygen mixture is first adjusted by means of the valves 41 and 47, while the oxygen is allowed to enter the end of the tool under suitable pressure, being controlled through the piston valve 59 by means of the button 53, which is located on the body of the tool where the operator's hand rests. The button may be depressed in the slot 70, so that the block 71 is entirely within the tool where slight movement to one side will displace the block from alignment with the slot and hold the block within the tool. Thus the piston valve 59 is held off its seat without the operator continuing to keep his finger on the button 53.

From the foregoing description the operation of the tool is apparent. Either function of the tool may be used without interfering with the mechanism for performing the other. The nozzles are the only parts which control the use to which the tool may be put, although I consider it within the scope of this invention to provide a single nozzle capable of functioning either as a welder or as a cutter. This latter nozzle's employment with the tool would be the same. The control of the acetylene gas would also be the same, in the one instance feeding in form of an annular stream, and in the other instance in the form of a jet. In the present arrangement it is impossible to release accidentally the flow of oxygen when the welding nozzle 12 is employed. The flame will at times burn in the passage 4, but it can never creep past the combustion chamber 73 formed in the member 20. When it reaches the chamber 73, the flame becomes extinguished due to the fact that the chamber acts as a path of the least resistance.

I do not intend to be limited to the details shown and described, as my invention is capable of numerous variations and modifications.

I claim:

1. A torch having a barrel provided with an inner passage and an outer passage for different gases and having one end adapted interchangeably to receive one of a plurality of nozzles for discharging the gases from the torch, a handle portion extending rearwardly from said barrel and having a valve head at the end thereof, said valve head serving to control the supply of said gases and to divert a part of one gas for mixture with the other gas, means adjacent the entrance of said inner and outer passages having a mixing chamber for said gases, and valve means operable between said means and said valve head and disposed within said handle portion for controlling the flow of one of the gases from said valve head to the nozzle.

2. A torch having a barrel provided with a plurality of concentric passages for different gases and having one end adapted interchangeably to receive one of a plurality of nozzles for receiving and for discharging gases from the torch, a handle at the opposite end of said barrel, a pair of concentric members providing coextending passages for said passages in said barrel, a valve head at the end of said handle, supply connections connecting at different points between said concentric members and said valve head, and a substantially cylindrically formed housing for said handle extending rearwardly to said valve head from said opposite end of said barrel for enclosing said concentric members and said supply connections.

3. In combination, a torch having a nozzle attached thereto at one end and inner and outer passages extending rearwardly from said nozzle, a valve head, connections supplying different fluid mediums extending from said passages to said valve head, including an annular mixing chamber substantially adjacent the juncture of said passages and said connections and communicating with the outer passage.

4. In combination, a torch having a nozzle attached thereto at one end and concentric passages extending rearwardly from said nozzle, a valve head, connections supplying different fluids extending from said concentric passages to said valve head including an annular mixing chamber substantially adjacent the juncture of said concentric passages and said connections and communicating with the outer concentric passage.

5. In a torch of the class described, in combination, a barrel comprising concentric conduits for different fluid mediums, a nozzle at one end of said barrel, a block at the opposite end having a passage therein in alignment with the inner conduit, and valve means for controlling the flow of a fluid medium therethrough, a connection between said block and said inner conduit including a pair of concentric members and a coupling providing a connecting passage between said block and said concentric members, the outer member being connected to said coupling, and means for connecting said members with said conduits.

6. In a torch of the class described, in combination, a barrel comprising a pair of concentric conduits for different fluid mediums, a nozzle at one end of said barrel, a block at the opposite end having a passage therein in alignment with one of said conduits, and valve means for controlling the flow of a fluid medium therethrough, a connection between said block and said conduit including a pair of concentric members and a coupling providing a connecting passage between said block and said concentric members, and means for connecting said members with said conduits.

7. In a torch of the class described, in combination, a barrel, a nozzle at one end of said barrel, a pair of concentric members at the opposite end having passages therein communicating with said barrel, the outer concentric member provided with a seat for receiving the inner concentric member, fluid supply means connecting with said passages in said concentric members, and means connecting said barrel and said concentric members to obtain a fluid tight joint therebetween and maintain the inner concentric member seated in the outer concentric member.

8. In a torch of the class described, in combination, a barrel having passages therein for different fluid mediums, a nozzle at one end of said barrel, a block at the opposite end having a passage adapted to communicate with one of the passages of said barrel, and valve means in said block for controlling the flow of a fluid through said passage therein, a connection between said block and said barrel for establishing said communication, said connection including a coupling and a pair of concentric members, said coupling provided with a connecting passage between said block and said concentric members.

9. In a torch of the class described, in combination, a barrel having passages therein for different fluid mediums, a nozzle at one end of said barrel, a block at the opposite end having a passage adapted to communicate with one of the passages of said barrel, a connection between said block and said barrel for establishing said communication, said connection including a coupling and a pair of concentric members, said coupling provided with a connecting passage between said block and said concentric members.

10. In a torch of the class described, in combination, a barrel having passages therein, a valve head and a cylindrical shell therebetween, fluid supply connecting means between said passages and said valve head and lying within said shell including a member in fluid tight relation with said barrel and containing a substantially central socket having communication with a plurality of fluid supplies, and a second member confined in said socket and containing passages extending therethrough for establishing communication between said fluid supplies and said passages.

11. In a torch of the class described, in combination, a barrel, a valve head, fluid supply connecting means between said barrel and said valve head including a tubular member in fluid tight relation with said barrel and containing a socket having communication with a plurality of fluid supplies, and a second member confined in said socket and containing passages extending therethrough for establishing communication between said fluid supplies and said barrel, one of said fluid supplies comprising an axially disposed valve block between said barrel and said valve head having a longitudinally movable piston valve therein for controlling the fluid therein.

12. In a torch of the class described, in combination, a barrel, a nozzle at one end of said barrel, a plurality of members at the opposite end containing passages for communication with said barrel, a valve block substantially in axial alignment with said barrel, a valve in said block operating along the axis thereof, and means for connecting said valve block with said members.

13. In a torch of the class described, in combination, a barrel having a plurality of passages therein, a nozzle at one end of said barrel, a block at the opposite end provided with a passage controlled by a spring valve normally held in closed position, a connection for establishing communication between the passage in said block and one of the passages in said barrel, and a pair of fluid supply pipes communicating with said barrel through said connection.

14. A cut weld torch comprising in combination, a barrel having one end adapted to receive a nozzle, a handle at the other end of said barrel, a valve head carried by said handle, a cutting fluid connection at said valve head extending substantially centrally through said handle and through said barrel to said nozzle, a valve in said cutting fluid connection controlled by a spring pressed button extending from the interior of said hande, and individual connections for the heating fluid extending from said valve head to said barrel.

15. A torch comprising in combination, a barrel having one end adapted to receive a nozzle, a handle at the other end of said barrel, fluid connections extending within said barrel, means serving to interconnect said barrel and said handle and having communicating passages to extend said fluid connections into said barrel, a valve block axially disposed in said handle, and a valve in said block for controlling the flow through one of said fluid connections.

16. A cut weld torch comprising in combination, a barrel having one end adapted to receive a nozzle, a handle at the other end of said barrel, fluid connections for a cutting and a heating fluid extending into said handle, means serving to interconnect said barrel and said handle and to extend said fluid connections into said barrel, said cutting fluid connection entering said means substantially centrally, and a valve block axially disposed in said barrel and provided with a valve for controlling the flow of said centrally disposed cutting fluid.

17. A torch comprising in combination, a barrel, a handle, fluid connections extending through said handle and barrel, a valve block disposed substantially axially along the interior of said handle, a valve for said block, a lever pivoted within said handle and operably connected to one end of said valve, and a radially inwardly depressible button protruding from said handle for actuating said lever.

18. A torch comprising in combination, a barrel, a handle, fluid connections extending through said handle and barrel to a nozzle carried by said barrel for supplying a heating and a cutting fluid to said nozzle, and a substantially axially disposed valve in said handle for controlling the flow of the cutting fluid.

19. A torch having a barrel, a handle and a valve head, fluid supply connections extending through said handle from said valve head, and means interconnecting said barrel and said fluid supply connections in fluid-tight relation comprising an outer member provided with passages communicating at one end with said fluid supply connections, the opposite end of said outer member being cored to provide a socket to receive an inner member, and a connecting member for bringing the adjacent end of said barrel against said outer and inner members, said connecting member fitting over and fastening to said outer member.

In witness whereof, I hereunto subscribe my name this 17th day of April, 1922.

ARCHIE F. DILLON.

CERTIFICATE OF CORRECTION.

Patent No. 1,668,107.    Granted May 1, 1928, to

ARCHIE F. DILLON.

It is hereby certified that error appears in the printed specification of the above numbered patent requiring correction as follows: Page 5, line 12, claim 15, for the word "barrel" read "handle"; and that the said Letters Patent should be read with this correction therein that the same may conform to the record of the case in the Patent Office.

Signed and sealed this 19th day of June, A. D. 1928.

(Seal)

M. J. Moore,
Acting Commissioner of Patents.

through said handle and through said barrel to said nozzle, a valve in said cutting fluid connection controlled by a spring pressed button extending from the interior of said hande, and individual connections for the heating fluid extending from said valve head to said barrel.

15. A torch comprising in combination, a barrel having one end adapted to receive a nozzle, a handle at the other end of said barrel, fluid connections extending within said barrel, means serving to interconnect said barrel and said handle and having communicating passages to extend said fluid connections into said barrel, a valve block axially disposed in said handle, and a valve in said block for controlling the flow through one of said fluid connections.

16. A cut weld torch comprising in combination, a barrel having one end adapted to receive a nozzle, a handle at the other end of said barrel, fluid connections for a cutting and a heating fluid extending into said handle, means serving to interconnect said barrel and said handle and to extend said fluid connections into said barrel, said cutting fluid connection entering said means substantially centrally, and a valve block axially disposed in said barrel and provided with a valve for controlling the flow of said centrally disposed cutting fluid.

17. A torch comprising in combination, a barrel, a handle, fluid connections extending through said handle and barrel, a valve block disposed substantially axially along the interior of said handle, a valve for said block, a lever pivoted within said handle and operably connected to one end of said valve, and a radially inwardly depressible button protruding from said handle for actuating said lever.

18. A torch comprising in combination, a barrel, a handle, fluid connections extending through said handle and barrel to a nozzle carried by said barrel for supplying a heating and a cutting fluid to said nozzle, and a substantially axially disposed valve in said handle for controlling the flow of the cutting fluid.

19. A torch having a barrel, a handle and a valve head, fluid supply connections extending through said handle from said valve head, and means interconnecting said barrel and said fluid supply connections in fluid-tight relation comprising an outer member provided with passages communicating at one end with said fluid supply connections, the opposite end of said outer member being cored to provide a socket to receive an inner member, and a connecting member for bringing the adjacent end of said barrel against said outer and inner members, said connecting member fitting over and fastening to said outer member.

In witness whereof, I hereunto subscribe my name this 17th day of April, 1922.

ARCHIE F. DILLON.

CERTIFICATE OF CORRECTION.

Patent No. 1,668,107.      Granted May 1, 1928, to

ARCHIE F. DILLON.

It is hereby certified that error appears in the printed specification of the above numbered patent requiring correction as follows: Page 5, line 12, claim 15, for the word "barrel" read "handle"; and that the said Letters Patent should be read with this correction therein that the same may conform to the record of the case in the Patent Office.

Signed and sealed this 19th day of June, A. D. 1928.

(Seal)

M. J. Moore,
Acting Commissioner of Patents.